April 30, 1963    J. H. WINCHESTER    3,087,752
MAT AND TRAY COMBINATION
Filed Aug. 15, 1961

*INVENTOR.*
JOHN H. WINCHESTER
BY
Oberlin, Maky & Donnelly
ATTORNEYS

United States Patent Office 3,087,752
Patented Apr. 30, 1963

3,087,752
MAT AND TRAY COMBINATION
John H. Winchester, Euclid, Ohio, assignor to The Eagle-Picher Company, Cincinnati, Ohio, a corporation of Ohio
Filed Aug. 15, 1961, Ser. No. 131,510
5 Claims. (Cl. 296—1)

The present invention relates to a mat and tray combination and, more particularly, to a combined mat and tray unit especially adapted for installation on a carpeted automobile floor.

The floor of an automobile and particularly the driver's compartment accumulate mud and dirt and the like debris over a period of use. The principal object of the present invention is, therefore, to provide a dirt catching tray which can be periodically removed, emptied, and then replaced.

Another object is to provide a mat and tray unit which is particularly useful for carpeted floors.

A further object is to provide a mat and tray combination in which the tray is snugly held by the mat without rattling and the like.

Other objects of the invention will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In general, in the present mat and tray combination the mat has a recess or opening of a peripheral configuration to receive snugly the tray and prevent its removal directly through such opening. The insertion and removal of the tray, therefore, is effected through an adjoining opening in the mat which communicates with the larger opening or recess. In the preferred embodiment, the mat and tray form a cooperating unit which may be directly installed on an automobile floor and especially a carpeted floor.

Figure 1:
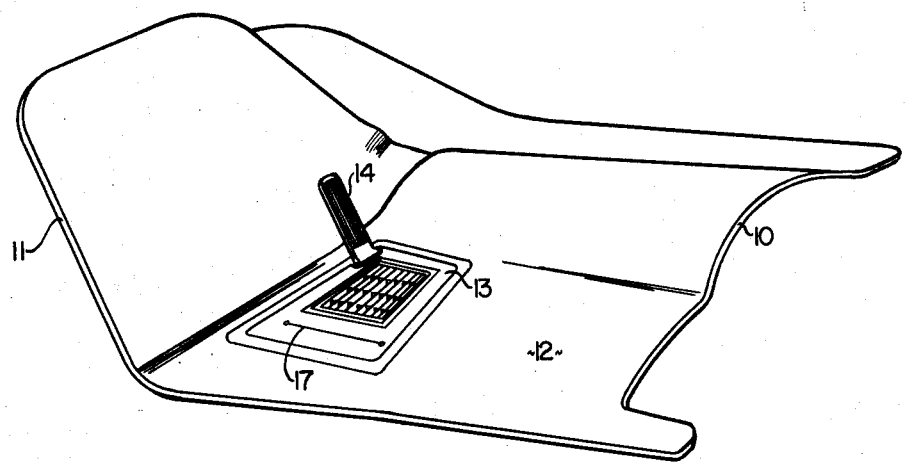
FIGURE 1 shows a mat and tray unit of the present invention installed on a carpeted floor of an automobile.

Referring to the drawings, FIGURE 1 illustrates a general floor configuration of an automobile having a transmission hump 10, a toeboard portion 11, and an overlying carpet 12. A mat section of the present unit comprises a flexible sheet 13 preferably composed of rubber such as reclaimed rubber. The mat or sheet 13 may be secured to the carpet 12, as by sewing or cementing, only adjacent the marginal edges of the sheet 13. Alternatively, other fastening means may be used, such as buttons, metal prongs which penetrate the carpet, and the like. Or the sheet 13 may merely lie over the floor and be held in place by its own weight or that of the unit. This sheet may as illustrated embrace the area of an accelerator pedal 14 when placed on the driver's side although inclusion of the accelerator pedal and allowance therefor are not necessary to the use of the present mat and tray combination.

The mat section or sheet 13 has an opening 15 (FIGURE 2) which, in the preferred form, is substantially in registry with a cutaway portion 16 (FIGURE 4) of the underlying carpet 12. Although the opening 15 is illustrated as rectangular, it will be appreciated that the opening can be of other polygonal peripheral configuration, circular, elliptical, and the like. In a similar manner, the cutaway portion 16 of the carpet should be at least as large as the opening 15 and preferably of substantially the same peripheral configuration to provide substantial registry with the opening 15 and support the marginal area around the opening 15. It is, of course, not necessary to cut away a portion of the carpet. Instead, the mat and tray may be treated as an accessory unit and allowed merely to lie over the carpet or other type of floor and be held in place by its own weight. In this instance, the tray means hereinafter described is desirably of an even more shallow depth. In this modification also, the periphery of the mat may or may not be secured to the carpet or other flooring as desired.

Figure 2:
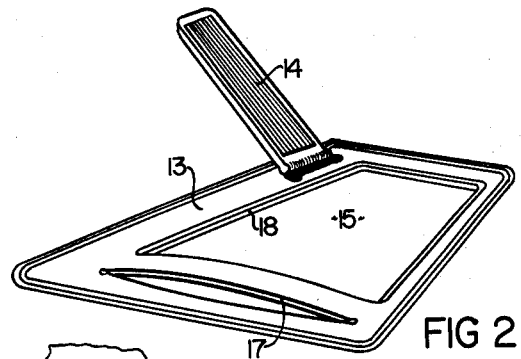
FIGURE 2 is an enlarged perspective view of the mat section of the unit of FIGURE 1 without the tray.

The mat section 13 also has a slotted opening 17 adjacent a side of the recess or opening 15, the former providing a lateral access to the latter. The slotted opening 17 can be distended by partially lifting the mat section 13 as shown in FIGURE 2, since the mat section is secured to the carpet 12 or other floor material, as mentioned, only adjacent the marginal edges of the mat section or sheet 13. Runners 18 are secured to the mat section 13 along sides of the opening 15 and are preferably composed of rubber molded integrally with the mat or sheet 13. It will be noted from FIGURE 4 that only two runners 18 are used, and these are stationed on opposite sides of the opening 15. These sides also parallel the direction of insertion or removal of the tray means with respect to the opening 15. The runners 18 are joined at their ends by a connecting strip 18a which need not have a lip overlapping the edge of the tray as do the runners 18. Behind the runners 18 and connecting strips 18a is a continuous backing strip 19 which may have ridges 19a to prevent slippage across the tray means by a user's feet. The backing strip 19 and the runners 18 and their connecting strips 18a may be individually molded and then secured to the mat section 13 (as illustrated) as by a rubber cement, but preferably all parts are integrally molded, for example, from reclaimed rubber. In addition to securing the unit to a floor along the margins of the sheet or mat 13, an inner portion may also be secured to the floor by passing suitable fasteners through openings 20.

Figure 4:
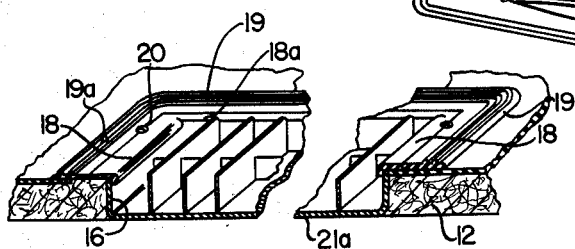
FIGURE 4 is a fragmentary cross-section taken across the mat and tray when combined and installed on a carpeted floor.
Figure 3:
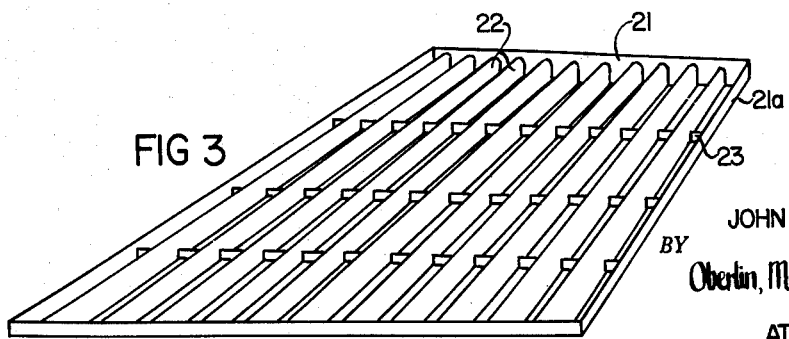
FIGURE 3 is an enlarged perspective view of the tray.

As shown in FIGURE 3, a tray 21 preferably is of rigid construction and comprises a relatively shallow pan portion 21a having a depth substantially equal to the thickness of the carpet 12 (note FIGURE 4). In order to maintain a floor elevation substantially equal to that of the installed mat section 13, a rib assembly nests within the pan 21a. The rib assembly includes parallel spaced ribs 22 held in assembly by cross pins 23. The tray and rib assembly may, for example, be composed of aluminum.

To install the preferred form of the present unit, as on a carpeted floor, it is necessary only to remove or cut away a portion of the carpet 12 to receive the pan portion 21a of the tray. The margins of the rubber sheet 13 are then preferably sewed, cemented, or otherwise fixed to the carpet, and if desired fasteners may be applied through the openings 20. Since the tray 21 is somewhat oversized with respect to the opening 15 due to the overlying and preferably gripping runners 18, the tray cannot be removed directly through the opening 15 and is in fact held snugly against vibrating and rattling by means of the runners 18.

When it is desired to empty the tray 21, the slotted opening 17 is distended as illustrated in FIGURE 2 and the tray withdrawn through that opening. Since the runners 18 are disposed only on the sides of the opening 15 paralleling the direction of the withdrawal, the runners do not interfere with the removal of the tray. When the tray is later inserted through the opening 17 and positioned within the opening 15, the action is the same in that the edges of the pan portion 21a merely slide under the overlying runners 18 as illustrated especially in FIGURE 4.

It will now be apparent that the present unit provides a dirt catching tray and especially one which can be periodically removed, emptied, and then replaced. The present mat and tray combination is particularly useful for carpeted floors such as may be found on an automobile floor. The mat portion of the unit snugly holds the tray to avoid vibration, rattling, and the like.

Other forms embodying the features of the invention may be employed, change being made as regards the features herein disclosed, provided those stated by any of the following claims or the equivalent of such features be employed.

I therefore particularly point out and distinctly claim as my invention:

1. A mat and tray combination including a mat having an opening, tray means within such opening having a peripheral configuration substantially matching that of the opening, peripheral means along such opening to prevent removal of the tray directly through the opening, said mat also having an entrance opening communicating with said first mentioned opening through which to insert the tray and position it within said first mentioned opening.

2. A mat and tray combination including a mat having an opening therein, tray means stationed within such opening, a runner member secured along at least two sides of such opening and overlying the tray means to prevent removal of said tray means through such opening, and an entrance opening in said mat adjacent such first mentioned opening to accommodate insertion of the tray means therethrough to position the tray means in the first mentioned opening.

3. A mat and tray combination for an automobile floor including a mat section having an opening therein, tray means stationed within such opening adapted to catch debris and like matter, said tray means having a peripheral configuration substantially conforming to that of such opening, an entrance slot in said mat section adjacent a side of such first mentioned opening to accommodate insertion and withdrawal of the tray means with respect to such first mentioned opening, and runner members secured to said mat section and stationed along margins of such first mentioned opening generally paralleling the direction of such insertion of the tray means into that opening, said runner members overlying the adjacent edges of the tray means to position said tray means with respect to the first mentioned opening and prevent removal of the tray means directly through such first mentioned opening.

4. A combined mat and tray unit for installation on an automobile floor, said unit including a rubber mat section adapted to be secured adjacent its marginal edges to the automobile floor and having an opening, a tray stationed within the opening and being recessed to catch debris and like matter, rib members carried within the tray recess to maintain a floor elevation substantially equal to that of the rubber mat section, said tray having a peripheral configuration substantially conforming to that of such opening, an entrance slot in said mat section adjacent a side of such first mentioned opening to accommodate insertion and withdrawal of the tray with respect to such first mentioned opening, and rubber runners integral with said rubber mat section stationed along margins of such first mentioned opening generally paralleling the direction of such insertion of the tray into that opening, said runners overlying and gripping adjacent edges of the tray to position said tray with respect to the first mentioned opening and prevent removal of the tray directly through such first mentioned opening.

5. In a carpeted automobile floor having a cutaway carpet portion, a combined mat and tray unit comprising a rubber mat section of greater area than said cutaway carpet portion and overlying said portion, said rubber mat section being secured to the carpet only adjacent the margins of said section, said rubber section having an opening substantially in registry with the cutaway carpet portion, a tray to catch debris and like matter stationed within the registered mat opening and cutaway portion and being recessed to a depth substantially equal to the thickness of such carpet, rib members carried within the tray recess to maintain a floor elevation substantially equal to that of the rubber mat section, an entrance slot in said mat section adjacent a side of the first mentioned mat opening whereby the mat section can be lifted away from the underlying carpet by virtue of such marginal securance only to permit insertion and withdrawal therethrough of the tray and positioning of said tray within the substantially registered mat opening and cutaway carpet portion, and rubber runners integral with said mat section stationed along margins of such first mentioned mat opening paralleling the direction of such insertion of the tray into that opening, said runners overlying and gripping the adjacent edges of the tray to position it with respect to the substantially registered mat opening and cutaway carpet portion and also prevent removal of the tray directly through such first mentioned mat opening.

References Cited in the file of this patent

UNITED STATES PATENTS

| | | |
|---|---|---|
| 1,883,737 | Duffy | Oct. 18, 1932 |
| 2,193,319 | Himmler | Mar. 12, 1940 |
| 2,258,238 | Collins | Oct. 7, 1941 |